United States Patent [19]
Holmes et al.

[11] Patent Number: 5,887,853
[45] Date of Patent: Mar. 30, 1999

[54] MINIMAL WEAR DISPENSING VALVE

[75] Inventors: Mark Holmes, Quaker Hill; John P. Breault, New Britain, both of Conn.

[73] Assignee: Loctite Corporation, Hartford, Conn.

[21] Appl. No.: 869,332

[22] Filed: Jun. 5, 1997

[51] Int. Cl.⁶ .................................................. F16K 31/165
[52] U.S. Cl. ........................................ 251/335.2; 251/367
[58] Field of Search ................................... 251/335.2, 367

[56] References Cited

U.S. PATENT DOCUMENTS

| | | | |
|---|---|---|---|
| 2,365,650 | 12/1944 | Shaw et al. | 251/335.2 |
| 3,868,969 | 3/1975 | Schwenk | 251/335.2 |
| 4,232,696 | 11/1980 | Burris et al. | 251/335.2 |

FOREIGN PATENT DOCUMENTS

| 515469 | 8/1955 | Canada | 251/335.1 |
|---|---|---|---|

*Primary Examiner*—A. Michael Chambers
*Attorney, Agent, or Firm*—Hoffman & Baron, LLP

[57] ABSTRACT

A minimal wear valve assembly which includes a fluid reservoir having an inlet port and an outlet port for passage of the fluid therethrough. The reservoir defines a valve seat about and downstream of the outlet port. The assembly includes a valve having a first substantially non-deformable valve surface. The valve is movable with respect to the valve seat from an open condition which permits flow of the fluid through the outlet port to a closed condition which prevents flow of the fluid through the outlet port. The valve supports a sealing member for movement with the valve. The sealing member has greater compressibility than the first valve surface and provides a seal between the first valve surface and the valve seat upon movement of the valve to the closed condition.

12 Claims, 4 Drawing Sheets

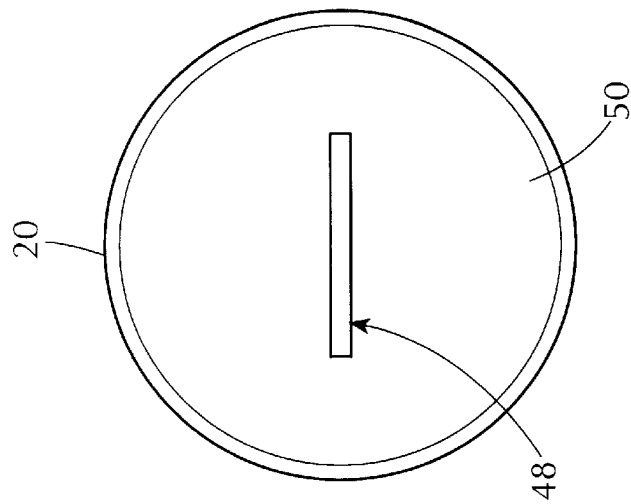
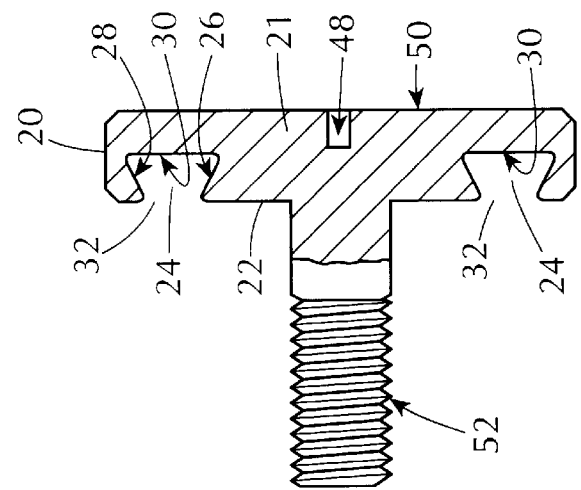
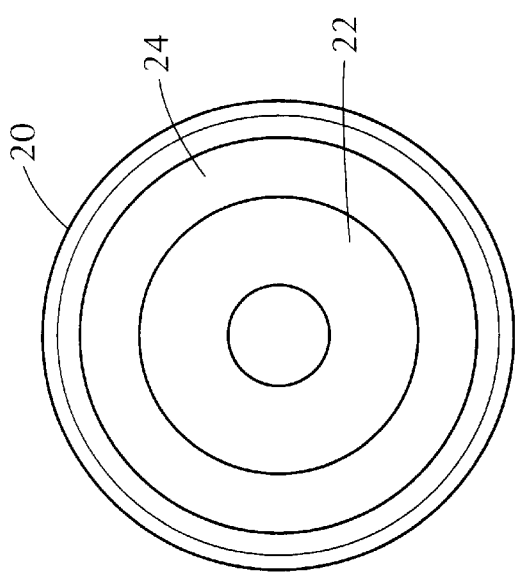
FIG. 2C
FIG. 2B
FIG. 2A 5,887,853

MINIMAL WEAR DISPENSING VALVE

FIELD OF THE INVENTION

The present invention relates generally to the field of valve assemblies. More specifically, the present invention relates to a valve assembly having improved sealing characteristics.

BACKGROUND OF THE INVENTION

Valve assemblies are well known for their ability to regulate fluid flow through inlet and/or exhaust openings. One such valve is a poppet valve. Poppet valves are typically made from heat-resistant steel and include a circular head or valve. The valve includes a conical face which registers with a corresponding valve seat bounding the opening. In some cases the head may be disk shaped and seat over a port opening. In other cases, such as with a ball-poppet valve, the head may be a spherical member which closes the valve when positioned against an opening having a conical or tapering surface. A guided stem, by which the valve is lifted from its seated position, is movable under the urging of an actuator. When the conical face of the valve rests on the valve seat the fluid is sealed from flowing through the valve.

As the materials which form the poppet valve assembly are substantially incompressible, early failure of the valve assembly can result when the valve is employed to dispense fluids containing high concentrations of substantially incompressible and abrasive inorganic additives or fillers. Some fillers, such as $Al_2O_3$, can cause frictional wear of the valve when flowing between the valve and the seat. Hertz-type stresses of the mating surfaces, which can cause flaking or shearing at the surfaces, are also known to occur when these solid fillers are pinched between a ball-poppet and the valve seat as the ball-poppet seals against the seat. As the ball-poppet reaches the final closed position there can be relative movement between a particle of the solid filler and the mating surfaces which can gouge the surface, creating a pathway between the mating surfaces through which the fluid may leak.

Furthermore, these solid fillers can become trapped between the mating surfaces as the poppet closes against the seat. Because the mating surfaces and the abrasive filler are all made from substantially incompressible materials, a particle of the filler becoming trapped between the mating surfaces can cause localized stress concentrations on the mating surfaces. Such localized stress concentrations can result in surface imperfections, distortions, and other irregularities, such as pitting or abrasive wear, which prevent sealing engagement between the valve and the seat, and thereby cause valve failure as the fluid will then have a pathway between the mating surfaces.

Some fillers may be crushed between the mating surfaces which can result in degradation of the material being dispensed. Some adhesives include fillers to provide a desired thermal or electrical characteristic to the adhesive. For example, glass spheres are within some dielectric adhesives to provide the desired insulative characteristics. These glass spheres can be about 1/5000 of an inch in diameter. These glass spheres could be crushed if trapped between two incompressible mating surfaces, which could then cause electrical shorts through the material and result in quality control problems for the user.

Currently, valves employed to dispense abrasive fluids employ poppet valves which seat a metal valve against a metal seat. Valve failure has been witnessed in these valves after 50,000 to 60,000 cycles of opening and closing. It would therefore be desirable to provide a valve assembly which provides suitable sealing characteristics between the valve and the valve seat and which minimizes the risk of failure when dispensing abrasive products.

SUMMARY OF THE INVENTION

The present invention provides a valve assembly having improved resistance to failure in connection with the dispensing of fluids containing abrasive fillers.

The present invention also provides a valve assembly that minimizes damage to the seating elements of the assembly when the valve closes to terminate fluid flow through the valve.

The present invention further provides a valve assembly that eliminates relative sliding between the seating elements of the assembly and any particles of abrasive filler material trapped therebetween as the valve seals against the valve seat.

The present invention still further provides a valve assembly that enhances quality control of the dispensed fluid by not adversely affecting the filler dispersed within the fluid.

In this regard, the present invention provides a minimal wear valve assembly which includes a fluid reservoir having an inlet port and an outlet port for passage of the fluid therethrough. The reservoir defines a valve seat about and downstream of the outlet port. The assembly includes a valve having a first substantially non-deformable valve surface. The valve is movable with respect to the valve seat from an open condition which permits flow of the fluid through the outlet port to a closed condition which prevents flow of the fluid through the outlet port. The valve supports a sealing member for movement with the valve. The sealing member has greater compressibility than the first valve surface and provides a seal between the first valve surface and the valve seat upon movement of the valve to the closed condition. The compressibility of the sealing member allows it to form around any trapped filler particles, without embedding the particle in the sealing member, while still maintaining the seal between the mating surfaces to prevent leakage of the valve.

And in a more specific aspect of the present invention, there is provided a minimal wear valve assembly for dispensing abrasive fluids. The valve assembly includes a fluid reservoir having an inlet port, an outlet port, an actuator port opposite the outlet port, and a valve seat positioned about and downstream from the outlet port. The fluid reservoir is formed from a substantially non-deformable material. The valve assembly also includes a valve having a having a substantially non-deformable first valve surface. The valve is movable with respect to the valve seat from an open condition permitting flow of the fluid through the outlet port to a closed condition preventing flow of the fluid through the outlet port. The valve is formed from a substantially non-deformable material. A sealing member, which has a greater compressibility than the first valve surface, is supported by the valve and provides a seal between the first valve surface and the valve seat upon movement of the valve to the closed condition. A valve stem extends from the valve into the fluid reservoir, adjacent the inlet port, and extends through the actuator port. The valve stem is formed of a substantially incompressible material. The valve assembly includes an elastomeric diaphragm sealing the actuator port. The diaphragm includes a diaphragm aperture. The valve stem extends through the diaphragm aperture and is in sealing engagement therewith.

The present invention will be more readily appreciated in a reading of the "Detailed Description of the Invention" with reference to the drawings.

BRIEF DESCRIPTION OF THE DRAWINGS

FIG. 2a depicts a bottom plan view of the valve of FIG. 1.

FIG. 2b depicts a vertical cross-section of the valve of FIG. 2a.

FIG. 2c depicts a top plan view of the valve of FIG. 2a.

FIG. 4b depicts a vertical cross-section of the valve of FIG. 4a.

FIG. 4c depicts a top plan view of the valve of FIG. 4a.

DETAILED DESCRIPTION OF THE INVENTION

Figure 1:
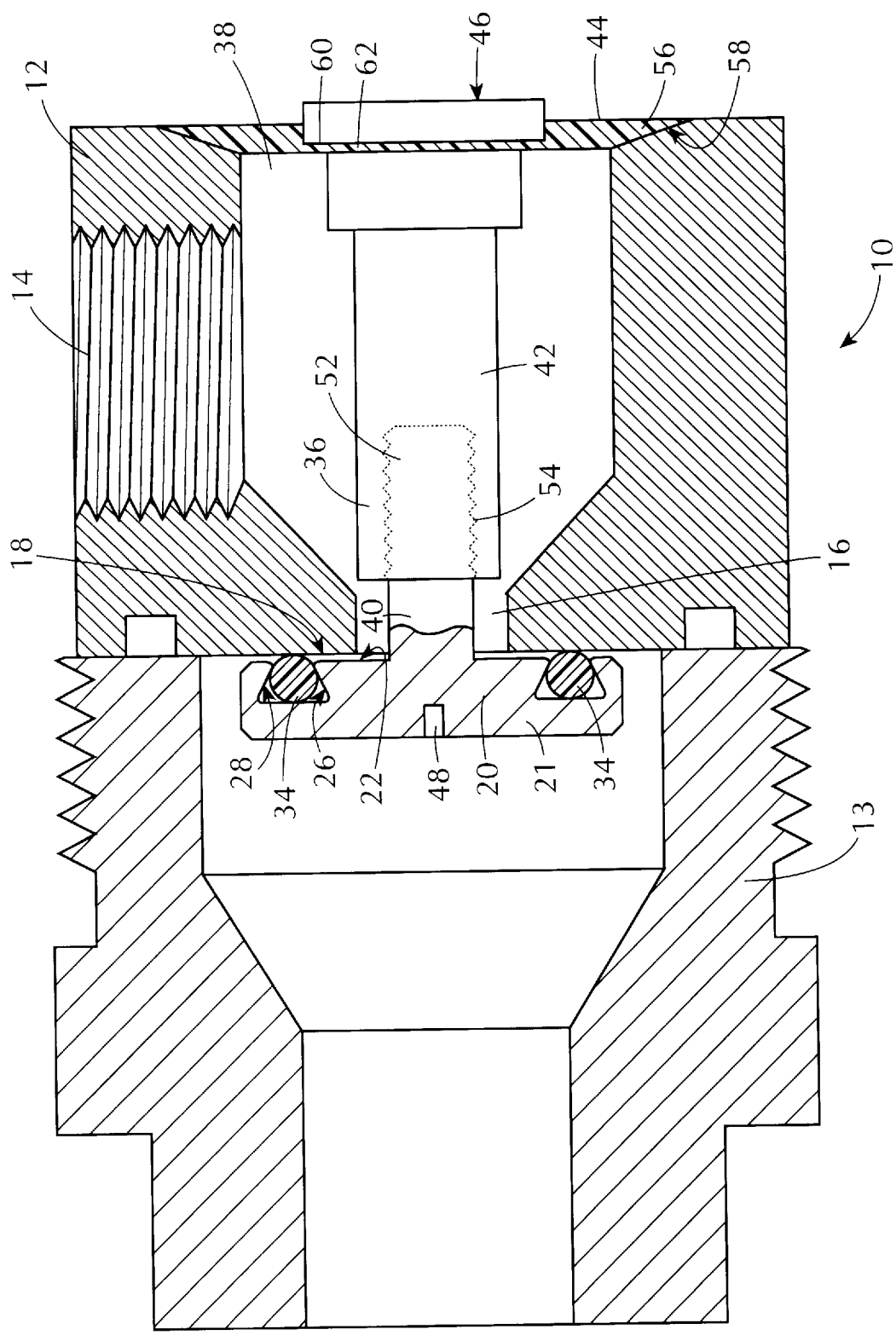
FIG. 1 depicts a sectional view of a valve assembly of the present invention employing an O-ring in combination with a poppet valve.

FIG. 1 shows a valve assembly 10 of the present invention. Assembly 10 includes a fluid reservoir 12 having an inlet port 14 and an outlet port 16. A valve seat 18 is located downstream from outlet port 16. Outlet port 16 may be perimetrically bounded by valve seat 18. Outlet port 16 opens to a downstream housing 13 which is secured in fluid communication with reservoir 12. As is well known in the dispensing art, downstream housing 13 may be attached to or form part of a fluid dispenser for dispensing fluid contained in reservoir 12. Fluid reservoir 12 and downstream housing 13 are typically formed of a rigid material such as metal or a structural polymeric material.

Assembly 10 also includes a valve 20 interposed within port 16. Valve 20 includes a disk-like member 21 and a depending stem 36. Disk member 21, which is designed to close port 16, is formed of a rigid incompressible material such as metal or a structural polymeric material. Disk member 21 includes a first valve surface 22 in registry with outlet port 16.

With additional reference to FIGS. 2a–c, valve 20 includes an annular channel 24 formed therein which opens onto first valve surface 22. The geometry of channel 24 may vary provided it serves to hold a sealing member for proper sealing of outlet port 16. Channel 24 may be formed having a trapezoidal cross section so as to include radially-opposed walls 26, 28 tapering towards each other from a channel base 30 towards a channel opening 32. Channel 24 supports therein a compressible sealing member, such as O-ring 34 as shown, for sealing engagement with valve seat 18 when valve 20 is positioned in the closed condition. O-ring 34 may be formed of Buna N rubber although other compressible elastomeric or resilient materials are contemplated as being within the scope of the present invention. The material selected to form the compressible sealing member should be elastic to deform about, without embedding, any filler particles that the member may trap against the valve seat, and strong to sealingly engage the valve seat under pressure. O-ring 34 has a cross-sectional diameter that is greater than the radially-transverse dimension of channel opening 32 and therefore is compressed when inserted into channel 24. Once inserted into channel 24, however, O-ring 34 may be maintained therein by an interference fit, although other means such as adhesion or mechanical attachment are also contemplated.

Valve stem 36 extends from first valve surface 22. Valve stem 36 is ordinarily an elongate generally cylindrical member. As seen in FIG. 1, valve stem 36 extends from disk member 21, through reservoir 12 adjacent inlet port 14, and through an actuator port 38 opposite outlet port 16. Valve stem 36 includes a first stem portion 40 which is formed to be contiguous with valve 20 and an interconnectable second stem portion 42. Second stem portion 42 extends through diaphragm 44 to present an actuation interface surface 46 which may be acted upon by an actuator (not shown). While valve stem 36 is shown in FIGS. 1 and 2 to be a two-piece construction, it is contemplated by the present invention that valve stem 36 may be a one-piece design as well.

First stem portion 40 and second stem portion 42 matingly engage each other to form a unitary incompressible valve stem 36 to simplify manufacture of valve assembly 10. First stem portion 40 includes a threaded male portion 52 distal from first valve surface 22. Threaded male portion 52 threads into the elongate threaded female portion 54 defined by second stem portion 42, as shown in FIG. 1. A tool such as a screwdriver may engage an elongate slot 48 to assist in the threading of first stem portion 40 into second stem portion 42.

Actuator port 38 supports a diaphragm 44 thereacross which provides for actuated movement of valve 20. Diaphragm 44 and second stem portion 42 seal actuator port 38 so as to prevent fluid flow therethrough. Diaphragm 44 includes a tapered circumferential edge 56 adhered to tapered annular rim 58 and an interior annular rim 60 which also defines an interior aperture 62 through which second stem portion 42 extends. Diaphragm 44 is typically formed of an elastomeric material which enables interior annular rim 60 to deflect with stem 36 when urged to open or close valve 20.

The valve of the present invention may be operated in the following manner. Fluid reservoir 12, being attached at inlet port 14 in fluid communication with a fluid source, retains the fluid at a higher internal pressure than exists in downstream housing 13. While the internal pressure in reservoir 12 may range up to about 250 pounds per square inch (psi), the internal pressure ranges useful herein may be varied to accommodate different materials and their particular viscosity, rheology, and thixotropy. An actuator assembly, pushing on actuator interface surface 46, forces stem 36 and valve 20 into the open condition away from valve seat 18. The higher internal pressure of reservoir 12 thereby dispenses the fluid through the open outlet port into housing 13. The fluid is dispensed until the actuator assembly retracts from engagement with surface 46, whereby the internal pressure of reservoir 12, acting against diaphragm 44, assists in moving diaphragm 44 in a direction away from outlet port 16. This motion of diaphragm 44 also carries stem 36 and valve 20 so as to re-engage valve 20 on valve seat 18 to define a closed condition, whereby fluid dispensement ceases. The O-ring 34 carried by disk member 21 forms a resilient liquid-tight seal against valve seat 18.

The compressibility of O-ring 34 allows for it to deform about any substantially incompressible solid materials embodied by the fluid being dispensed. Should a particle, for example, of an abrasive filler, become entrapped between O-ring 34 and valve seat 18 when valve 20 is in the closed condition, O-ring 34 is able to deform about the filler particle and maintain a sealing engagement. The sealing member should prevent both excessive Hertz-type stress formation in the components of the valve assembly and degradation of the material properties of the fluid being dispensed resulting from particles of filler material being trapped between the mating surfaces.

Moreover, as the sealing force exerted by O-ring 34 is normal to valve seat 18, there is no sliding engagement between the mating surfaces which could cause a trapped filler particle to damage the sealing surfaces of either valve 20 or valve seat 18. The present invention therefore provides a valve well suited to dispensing fluids having high concentrations of inorganic fillers, such as $Al_2O_3$. An example of such a fluid is a polymerized silicone available commercially from Loctite Corporation, Rocky Hill, Conn. under the name "LOCTITE PRODUCT 5404". The present invention also provides improved quality control of dispensed products such as thermal adhesives having thermally-conductive filler particles or dielectric adhesives having spacer materials formed of glass spheres of about 1/5000 of an inch in diameter. Furthermore, the present invention also provides a valve capable of dispensing fluids having a wide range of viscosities, under suitable pressures for the chosen material, and typically under pressures ranging up to 250 psi or even greater. Whereas conventional poppet valves dispensing abrasive fluids have typically failed after about 50,000 to 60,000 cycles, preliminary tests of the present invention were terminated after about 998,000 cycles without any observed failure.

Figure 3:
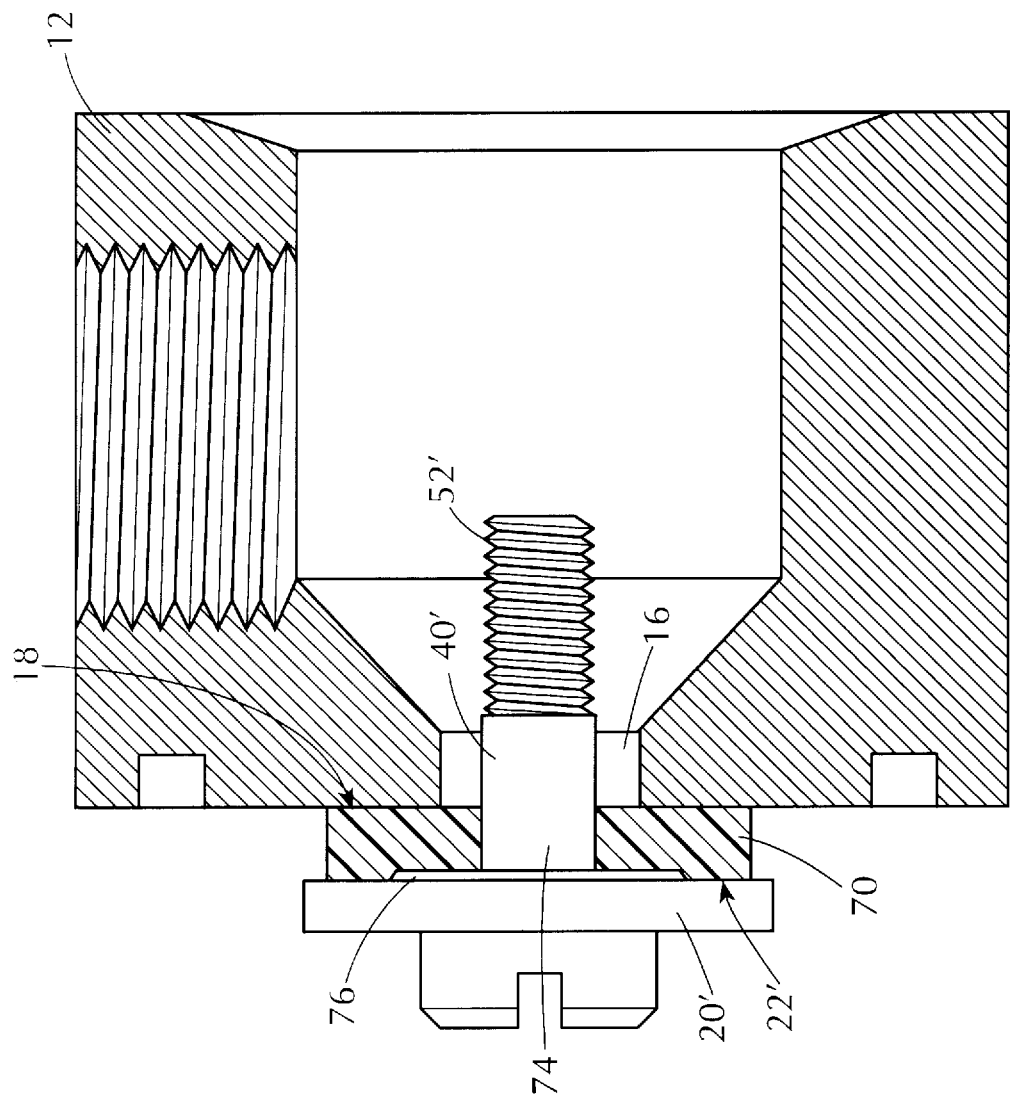
FIG. 3 depicts an alternate embodiment of the valve of the present invention.

FIG. 3 shows an alternate embodiment of the present invention wherein valve 20' supports a compressible, i.e. deformable, and/or resilient gasket 70 as the sealing member on a first valve surface 22' for sealing engagement with valve seat 18 of reservoir 12. Gasket 70 is an annular member having an interior annular aperture 74 through which first stem portion 40' extends. First stem portion 40' includes threaded male portion 52' which is designed to matingly engage a threaded female portion of a second stem portion (not shown) for securement to a diaphragm (also not shown) in a similar manner as shown for the embodiment of FIG. 1.

Figure 4C:
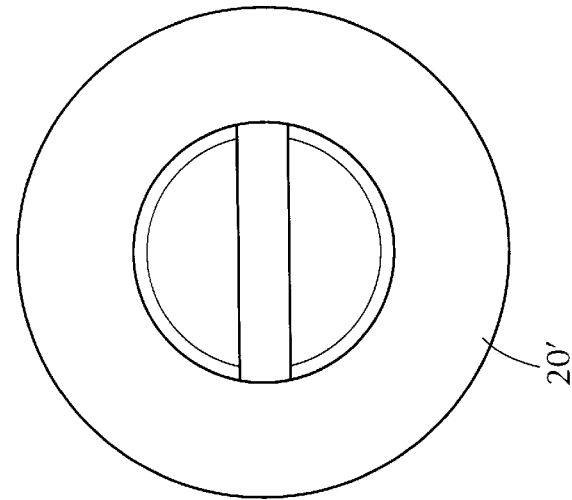
Figure 4B:
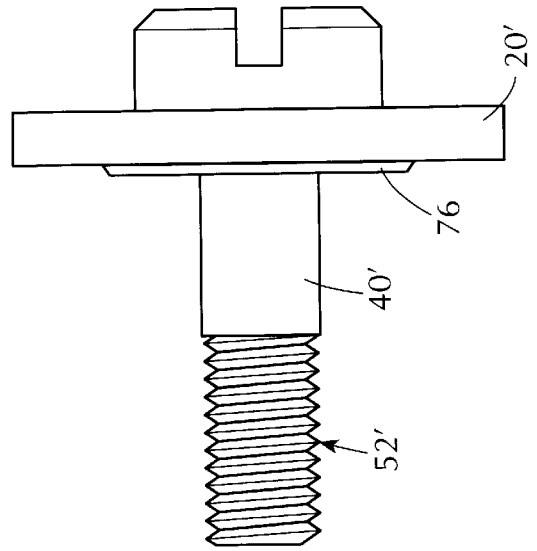
Figure 4A:
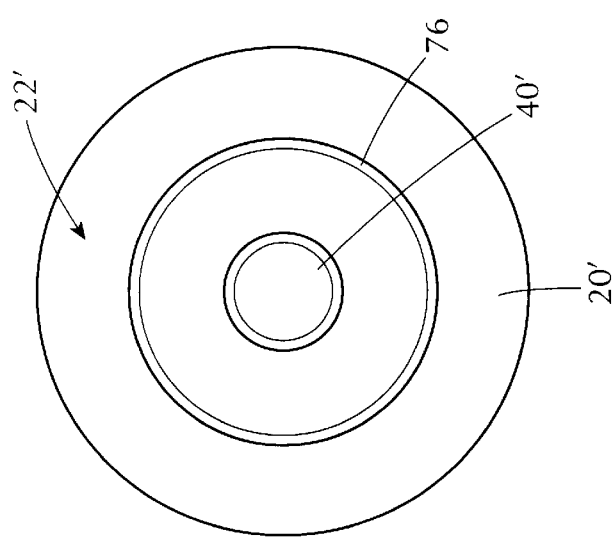
FIG. 4a depicts a bottom plan view of the valve of FIG. 3.

With reference to FIG. 4a–c, first valve surface 22' desirably supports a projecting annular rib 76 positioned opposite valve seat 18. Gasket 70 compresses about projecting annular rib 76 when valve 20' is moved to the closed condition with respect to valve seat 18 to provide increased seal integrity about outlet port 16. While gasket 70 is shown in FIG. 3 having an inner diameter smaller than the diameter of outlet port 16, the present invention also contemplates that gasket 70 may have an inner diameter equal to or larger than the diameter of outlet port 16.

The gasket 70 functions in a manner similar to O-ring 34 of FIG. 1. The compressibility of gasket 70 allows deformation about any filler particles entrapped between gasket 70 and valve seat 18. Further, compressibility of gasket 70 forms a resilient liquid-tight seal against valve seat 18 which is resistant to abrasion or wear from the filler contained within certain fluids to be dispensed. Gasket 70 is formed of a sufficiently resilient material that can deform about any trapped filler particles without embedding the particles in the gasket.

While the present invention has been shown and described herein, it will be evident to those persons of ordinary skill that changes and modifications may be made without departing from the teachings of the invention. Accordingly, that which is set forth in the foregoing description and accompanying drawings is offered by way of illustration only and not as a limitation. The scope of the invention is defined by the claims.

What is claimed is:

1. A valve assembly comprising:
    a fluid reservoir having an inlet opening and an outlet opening for passage of a fluid therethrough, said reservoir defining a valve seat about said outlet opening, said outlet opening being upstream of said valve seat;
    a valve having a first substantially non-deformable valve surface and being movable with respect to said valve seat from an open condition permitting flow of the fluid through said outlet opening to a closed condition preventing flow of the fluid through said outlet opening; and
    a sealing member supported by said valve for movement with said valve, said sealing member having greater compressibility than said first valve surface and providing a seal between said first valve surface and said valve seat upon movement of said valve to said closed condition;
    wherein said first valve surface defines an annular channel for supporting said sealing member, said annular channel including a pair of radially opposed sidewalls and a channel base, said sidewalls tapering towards each other from said channel base towards the first valve surface, said sidewalls supporting said sealing member in said channel.

2. The valve assembly of claim 1, wherein said compressible member is resilient.

3. The valve assembly of claim 1, wherein said compressible member is an O-ring.

4. The valve assembly of claim 1, wherein said outlet opening is perimetrically bounded by said valve seat.

5. The valve assembly of claim 1, wherein said annular channel is further defined adjacent a side wall about said first valve surface.

6. The valve assembly of claim 1, wherein an O-ring is supported in said channel by an interference fit.

7. The valve assembly of claim 5, wherein said compressible member is a gasket.

8. The valve assembly of claim 5, wherein said gasket is positioned on said first valve surface to engage said valve seat away from and perimetrically about said outlet opening.

9. The valve assembly of claim 1, further including an elongate stem supported in said reservoir adjacent said inlet opening to move said valve between said open condition and said closed condition.

10. A valve assembly for dispensing abrasive fluids, comprising:
    a fluid reservoir including an inlet port, an outlet port, an actuator port opposite said outlet port, and a valve seat downstream from said outlet port, said fluid reservoir being formed from a substantially non-deformable material;
    a valve having a substantially non-deformable first valve surface and being movable with respect to said valve seat from an open condition permitting flow of the fluid through said outlet port to a closed condition preventing flow of the fluid through said outlet port, said valve being formed from a substantially non-deformable material, said valve further comprising an annular channel defined by said first valve surface of said valve, said annular channel defining a pair of radially opposed sidewalls and a channel base, said channel base positioned opposite a channel opening defined by said first valve surface, said opposed sidewalls tapering towards each other from said channel base towards the channel opening;
    a sealing member supported within said channel of said valve, said sealing member having greater compressibility than said first valve surface and providing a seal between said first valve surface and said valve seat upon movement of said valve to said closed condition;
    a valve stem extending from said valve into said fluid reservoir, adjacent said inlet port, and extending through said actuator port, said valve stem formed of a substantially incompressible material; and an elastomeric diaphragm sealing said actuator port, said diaphragm including a diaphragm aperture, said valve stem extending through said diaphragm aperture and in sealing engagement therewith.

11. The valve assembly of claim 10, wherein said outlet port is perimetrically bounded by said valve seat.

12. A valve assembly for dispensing abrasive fluids, comprising:

a fluid reservoir including an inlet port, an outlet port, an actuator port opposite said outlet port, and a valve seat downstream from said outlet port, said fluid reservoir being formed from a substantially non-deformable material;

a valve having a substantially non-deformable first valve surface and being movable with respect to said valve seat from an open condition permitting flow of the fluid through said outlet port to a closed condition preventing flow of the fluid through said outlet port, said valve being formed from a substantially non-deformable material and having said first valve surface supports an annular rib thereon for engaging said sealing member;

a sealing member supported by said valve, said sealing member having greater compressibility than said first valve surface and providing a seal between said first valve surface and said valve seat upon movement of said valve to said closed condition;

a valve stem extending from said valve into said fluid reservoir, adjacent said inlet port, and extending through said actuator port, said valve stem formed of a substantially incompressible material; and an elastomeric diaphragm sealing said actuator port, said diaphragm including a diaphragm aperture, said valve stem extending through said diaphragm aperture and in sealing engagement therewith.

* * * * *